Sept. 20, 1971   J. W. SHAFFER ET AL   3,606,607

PHOTOFLASH LAMP

Filed Sept. 25, 1967

INVENTORS
JOHN W. SHAFFER
WILLIAM C. FINK
BY Joseph C. Ryan
ATTORNEY 3,606,607
PHOTOFLASH LAMP
John W. Shaffer, Montoursville, and William C. Fink,
Williamsport, Pa., assignors to Sylvania Electric Products, Inc.
Filed Sept. 25, 1967, Ser. No. 670,237
Int. Cl. F21k 5/02
U.S. Cl. 431—93                                  2 Claims

ABSTRACT OF THE DISCLOSURE

A percussive-type photoflash lamp having an anvil with a flat working face seated on a rim around a coined depression formed in the bottom of the primer shell.

---

This invention relates to the manufacture of photoflash lamps and more particularly those of the percussive-type.

Generally speaking, a percussive-type photoflash lamp comprises an hermetically sealed, light-transmitting envelope containing a source of actinic light and having a primer secured thereto. More particularly, the percussive-type photoflash lamp comprises a length of glass tubing constricted to a tip at one end thereof and having the shell portion of a primer secured to the other end thereof. The length of glass tubing which defines the lamp envelope contains a combustible such as shredded zirconium foil and a combustion-supporting gas such as oxygen. The primer comprises a metal shell within which an anvil and a charge of fulminating material are disposed.

Operation of a percussive-type photoflash lamp is initiated by a firing pin which is caused to strike the bottom of the primer cup or shell to promote ignition of the charge of fulminating material disposed therein. Deflagration of the charge ignites the shredded foil, the combustion of which is the source of the actinic light.

The principal object of this invention is to provide a percussive-type flashlamp having a very high degree of ignition reliability.

Another object is to provide a percussive-type flashlamp which is structurally simple and which readily lends itself to high speed, mass production techniques.

Percussive-type flashlamps, unlike firearms, must be fired reliably with a minimum firing pin impact, because excessive jarring or vibration of the camera would result in a blurred and thus unacceptable picture. Thus ignition of the primer charge must be effected with the least possible firing pin energy.

Not only must the primer charge be ignited with a minimum of firing pin energy but it also should be ignited with a high degree of reliability from lamp to lamp. Thus a high degree of uniformity within close tolerance during manufacturing suggests itself. For example, the automatic maintenance of a close tolerance spacing between the bottom of the primer cup or shell and the adjacent face of the anvil would be highly desirable. On the other hand it would be very desirable also if the structure were such that reliable ignition could be obtained in spite of slightly off-center impact by the firing pin.

In view of the foregoing, a percussive-type flashlamp in accordance with the principles of this invention is provided with a flat-faced anvil seated on a rim around a coined depression formed in the bottom of the primer shell.

In the specific embodiment of the invention illustrated in the accompanying drawing, FIG. 1 is an elevational view partly in section of a percussive-type photoflash lamp.

Figure 1:
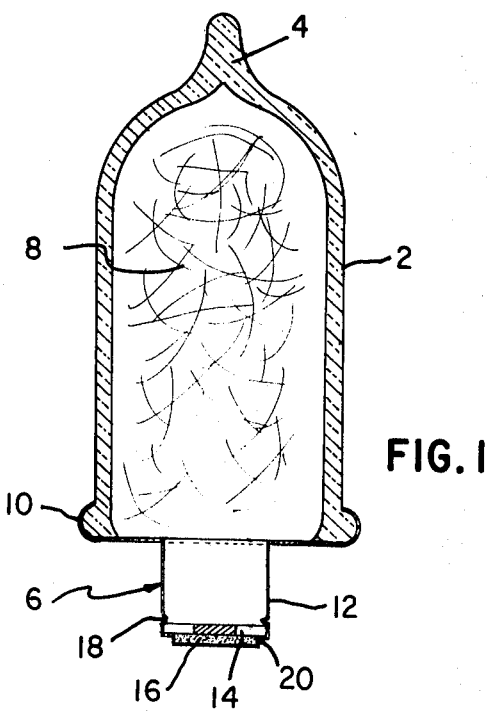
Figure 2:
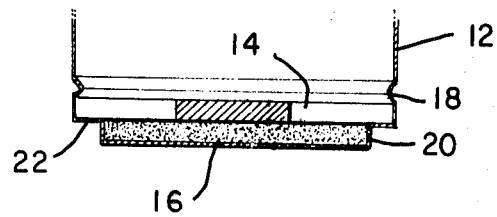
FIG. 2 is a fragmentary sectional detail on an enlarged scale of the primer of FIG. 1.
Figure 3:
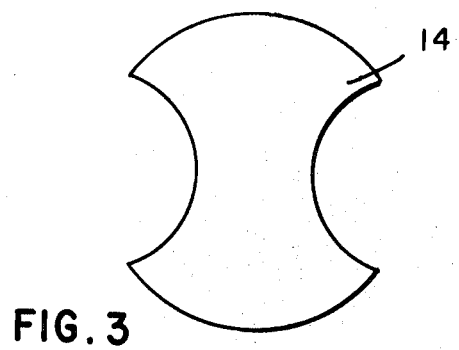
FIG. 3 is a plan view of one form of anvil, being the form of anvil shown in FIGS. 1 and 2.

Referring now to the drawing, particularly FIG. 1 thereof, the flashlamp illustrated therein comprises a lamp envelope 2 having an exhaust tip 4 defining one end thereof and having a primer 6 sealed to the other end thereof. A combustible such as filamentary zirconium 8 and a combustion-supporting gas such as oxygen are disposed within the lamp envelope 2. The primer 6 comprises a metal shell or base 10 having a central depending cup portion 12 within which anvil 14 and a charge 16 of fulminating material are disposed. The cup 12 is crimped at 18 to secure the anvil 14 in place therein. The bottom of the cup 12 is coined to define an accurately dimensioned reservoir 20 within which the charge of fulminating material is disposed and to provide an internal rim 22 on which the flat-faced anvil 14 is seated.

Since most of the impact energy of a firing pin goes into the deformation of the primer cup, it is highly desirable therefore to achieve ignition with the least possible depth of indentation thereof. It is essential also, in order to provide high flash reliability among a group of these lamps, that the cup-to-anvil spacing be held to a very close tolerance.

The necessary precision of spacing between the anvil 14 and the inner face of the bottom of the cup 12 may be readily attained on automated production machinery by the flat face construction of the anvil in combination with the coined depression formed in the bottom of the cup to define a reservoir 20 for the charge 16 of fulminating material. Uniform spacing is assured by seating the flat face of the anvil on the internal rim 22 around the reservoir 20 and securing it therein by the crimp 18.

The anvil 14 as shown is a two-lobed member and thus is relatively simple to manufacture since it may be stamped from sheet metal, such as steel for example. Other shapes of anvils having a flat working face may also be used without departing from the spirit of the invention.

The coined bottom construction is particularly advantageous since the thickness of the metal in the coined depression may be reduced during the coining operation, thereby increasing the sensitivity to firing pin impact. In addition, since the anvil working face and the cup bottom are parallel, the spacing is uniform over a considerable area. This is particularly advantageous because no greater pin penetration would be required for any slight off-centering of the firing pin and ignition sensitivity and reliability would not be adversely affected.

The spacing between the cup bottom and the anvil may be set at 0.02 inch or less. In this particular modification, optimum spacing appears to be about 0.006 inch. Once a definite spacing has been chosen, it is desirable to maintain that value with high precision (e.g. ±0.001 inch) in order to assure reproducible sensitivity and reliable ignition. The construction of this invention makes possible close control of the spacing in the impact area independently of normal dimensional variance in the metal thickness of the anvil or the primer cup.

What we claim is:
1. A photoflash lamp comprising:
a hermetically sealed, light-transmitting envelope;
a quantity of filamentary combustible material located within said envelope;
a combustion-supporting gas in said envelope;
and a primer secured to and closing one end of said envelope, said primer comprising a cup having a coined depression formed in the bottom thereof, a charge of fulminating material disposed in said coined depression and a flat-faced anvil overlying said charge, said cup being crimped to secure said anvil therein.

2. The combination of claim 1 in which said cup has a rim around said coined depression, said anvil is seated on said rim, and said cup is crimped to secure said anvil therein.

References Cited

FOREIGN PATENTS 177,612   9/1935   Switzerland _____ 431—93

CHARLES J. MYHRE, Primary Examiner